United States Patent [19]
Goser et al.

[11] Patent Number: 5,597,368
[45] Date of Patent: Jan. 28, 1997

[54] TOOTHED BELT HAVING AN END ATTACHMENT PART

[75] Inventors: Hubert Goser, Dannenberg; Detlef Harbecke, Rosche; Helmut Wille, Aichwald, all of Germany

[73] Assignee: Continental Aktiengesellschaft, Hanover, Germany

[21] Appl. No.: 495,893

[22] Filed: Jun. 28, 1995

[30] Foreign Application Priority Data

Jun. 28, 1994 [DE] Germany .......................... 44 22 549.0

[51] Int. Cl.⁶ .................................................. F16G 3/02
[52] U.S. Cl. .......................... 474/204; 474/218; 474/236; 24/33 F; 24/33 B; 24/35
[58] Field of Search ........................ 474/204, 205, 474/207, 218, 233, 235, 236; 24/33 F, 33 B, 35

[56] References Cited

U.S. PATENT DOCUMENTS

| | | | |
|---|---|---|---|
| 2,185,563 | 1/1940 | Palmer. | |
| 3,194,082 | 7/1965 | Mollenkamp | 474/205 |
| 3,472,089 | 10/1969 | Walls | 474/205 |
| 4,520,684 | 6/1985 | Meyer et al. | 474/205 X |
| 4,799,919 | 1/1989 | Kozachevsky et al. | 474/205 |
| 4,912,812 | 3/1990 | Henn et al. | 474/204 X |
| 5,106,345 | 4/1992 | Moore et al. | 474/253 |

Primary Examiner—Roger J. Schoeppel
Attorney, Agent, or Firm—Walter Ottesen

[57] ABSTRACT

A toothed belt is provided with at least one end attachment part for connecting an end portion of a toothed belt to a housing part or a component to be driven. The end attachment part is a formed strip made of metal or plastic in order to make the attachment of the toothed belt quicker and simpler. The strip has elements or sections which engage in the teeth of the end portion and are securely held therein. In the assembled condition, the end attachment part includes a portion to facilitate a mechanical connection at its end facing away from the end portion of the toothed belt.

5 Claims, 1 Drawing Sheet

TOOTHED BELT HAVING AN END ATTACHMENT PART

FIELD OF THE INVENTION

The invention relates to a toothed belt having at least one end attachment part for connecting an end portion of the toothed belt to a housing part or to a component to be driven. The end attachment part comprises a formed strip of metal or plastic which has elements or sections engaging the teeth. These elements or sections can be secured in the teeth. When assembled, the end attachment part has a mechanical connector such as an eyelet at its end facing away from the end portion of the toothed belt.

BACKGROUND OF THE INVENTION

Toothed belts are used to drive, for example, gates, hoisting devices, doors and in-line shafts. These toothed belts are especially suitable for effecting linear movements.

The toothed belts run on toothed wheels and are, for example, attached with their ends to a component which is to be displaced linearly. This end attachment has, up until now, been achieved by connecting profiled plates to a pressure plate utilizing threaded fasteners. The profiled clamping plates must be provided with the corresponding toothed profile. A pressure plate lies on the non-profiled surface of the end portion of the toothed belt. Clamping plate and pressure plate are tightened with respect to each other utilizing tension screws so that the end portion of the toothed belt is clamped in a form-tight interlocking manner.

U.S. Pat. No. 5,106,345 discloses an end attachment part for a toothed belt. The end attachment part is here made from a strip of metal having cutouts for accommodating the teeth of the end portion of the toothed belt. Fingers, which can be bent over, extend from the edges of the strip. These fingers are, in the attached state, bent over the non-profiled surface of the toothed belt to fix the end portion of the toothed belt. The tension forces which can be transmitted are not always adequate especially for heavy gate drives.

SUMMARY OF THE INVENTION

It is an object of the invention to provide a toothed belt having an end attachment part which permits higher drive loads to be reliably transmitted.

The toothed belt of the invention has an end portion with first and second sides and with a tooth configuration formed in one of the sides. The tooth configuration has a plurality of teeth with each two mutually adjacent ones of the teeth defining a tooth gullet. The toothed belt includes: an end attachment part for connecting the end portion to a component including a housing part or a part to be driven by the toothed belt; the end attachment part including a formed strip made of metal or plastic; the formed strip being bent over 180° to define first and second legs enclosing the end portion therebetween; the first leg being formed to have a profile corresponding to the tooth configuration so that the first leg interengages with the tooth configuration when placed thereagainst; holding means coacting with the second leg to hold the first leg in the tooth gullets of the tooth configuration; and, the formed strip having an end section conjointly defined by the first and second legs when the formed strip is bent over and the end section defining connecting means for facilitating the connection of the end portion of the toothed belt to the component.

The particular end portion of the toothed belt is surrounded by the legs of the end attachment part. A very rapid coupling to the particular component or connecting part is possible via the connector element such as an eyelet. A reliable interlock attachment of the end attachment part and an adequate transmission of tension force is made possible by the engagement of the corresponding profiled leg in the toothed profile and the firm placement in the tooth gullet.

The end attachment part made from the formed strip such as a sheet metal strip can be applied directly during production of the toothed belt. In this way, a simple assembly at the end user is made possible. The end user simply makes the connection to the drive, a machine housing or another end of a belt.

The strip bent by 180° defines a clamp which surrounds the end portion of the toothed belt. The two legs of the strip are placed from above and below, respectively, on the end portion of the toothed belt. The clamp hooks then snap into the profiled section of the lower leg and secure the same in the tooth gullets. The externally located arc of the strip defines an eyelet and provides a simple connecting possibility for the end assembly in each application. The tension load is transmitted via the flanks of the toothed profile.

In a further embodiment, the strip is bent over to form a clamp and is especially a sheet metal strip. This strip includes a recess formed in its arc through which the end portion of the toothed belt is pushed. The two free ends of the legs of the sheet metal strip are equipped with lugs defining eyes. The openings defined in this manner are secured via an appropriate pin coupling.

In an advantageous embodiment of the invention, the non-profiled leg has longitudinally extending edges having a width corresponding to the width of the end portion of the toothed belt. Bendable clamping hooks extend from these edges in correspondence to the tooth pitch of the toothed belt. The smooth back of the toothed belt is centered between the edges when the clamping hooks are bent over into the profiled base of the other leg.

With the invention, the toothed belt is equipped with an end attachment part which has a profiled leg which simulates in true form the toothed profile of the end portion. In this way, a good transmission of the tension load is provided via the toothed flanks.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
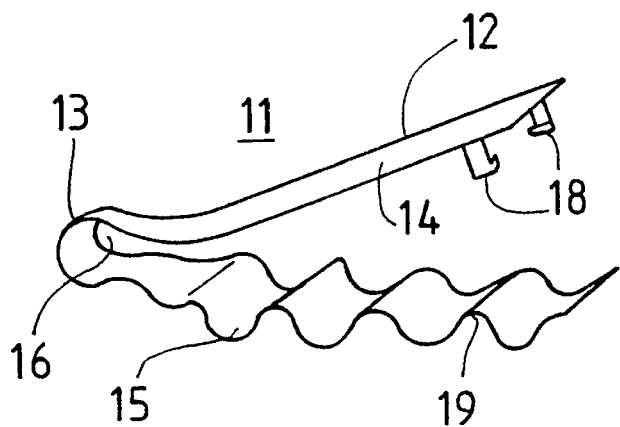
FIG. 1 shows a first embodiment of an end attachment part formed from a sheet metal strip which is mounted on the end portion of a toothed belt in the form of a clamp.

The end attachment part 11 shown in FIG. 1 comprises a formed sheet metal strip 12 which is bent 180° at its center. The arc 13 formed in this way defines a bulge 16 between the two legs 14 and 15. The bulge 16 serves as an attachment eyelet.

The lower leg 15 shown in FIG. 1 is configured so as to have a wave-like shape. The form and pitch of this configuration corresponds to the pitch and form of the teeth of the end portion of the toothed belt (not shown) which is to be attached. The upper leg 14 is elastically movable against the lower leg 15 and is placed on the back of the toothed belt at the end portion thereof during assembly. Elastically movable clamp hooks 18 snap transversely to the longitudinal direction of the toothed belt into a wave trough 19 of the lower leg 15 and, in this way, secure the clamp-like end attachment part 11 to the end portion of the toothed belt (not shown).

Figure 2:
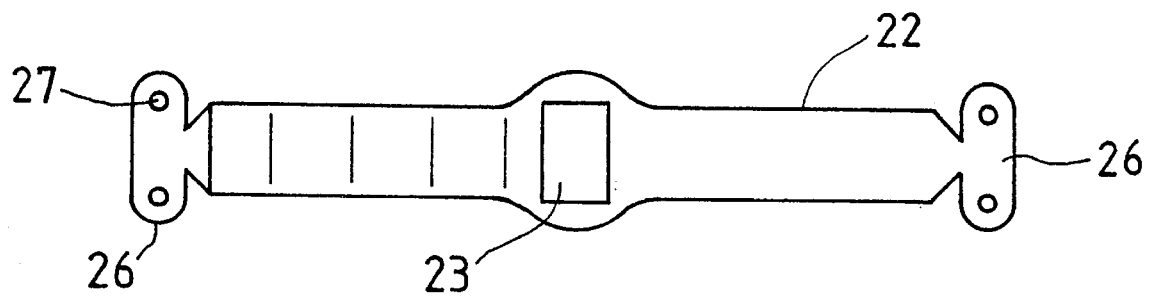
FIG. 2 is a developed view of a stamped part for making an end attachment part according to another embodiment of the invention; and, FIG. 3 shows the end attachment part formed from the stamped part of FIG. 2 and includes a chain latch which is also shown.
Figure 3:
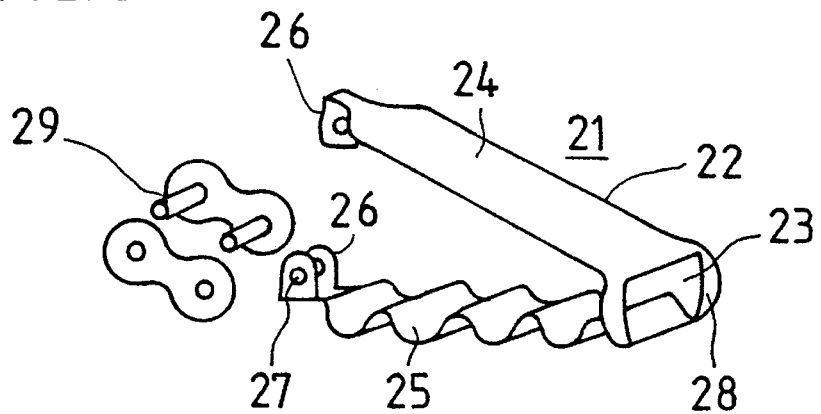

A modified embodiment of a clamp-like end attachment 21 is shown in FIGS. 2 and 3. In FIG. 2, the stamped metal strip 22 is shown before it is formed further.

The sheet metal strip 22 has a rectangular pass-through opening 23 in the longitudinal center thereof. Attachment sections 26 are provided at both ends and each has two openings 27 formed therein.

As shown in FIG. 3, the attachment sections 26 are bent up by 90° to form two pairs of lugs which are directly opposite to each other after the sheet metal strip 22 is bent by 180° and after the two mutually adjacent legs 24 and 25 are formed. The lower leg 25 has a wave-like profile with a pitch and form which correspond to the tooth pitch and tooth form of the end portion (not shown) of the toothed belt. The end portion of the toothed belt is guided through the pass-through opening 23 in the arcuate segment 28 of the formed sheet metal strip 22 during assembly. The lower leg 25 is pressed with its waves into the tooth gullets of the end portion of the toothed belt and the upper leg 24 is pressed onto the back of the toothed belt. In this way, the openings 27 of the fixing lugs 26 are brought to a spacing relative to each other which permits a chain latch 29 to be passed through for securing this position of the end attachment part 21.

It is understood that the foregoing description is that of the preferred embodiments of the invention and that various changes and modifications may be made thereto without departing from the spirit and scope of the invention as defined in the appended claims.

What is claimed is:

1. A toothed belt having an end portion with first and second sides and with a tooth configuration formed in one of said sides, said tooth configuration having a plurality of teeth with each two mutually adjacent ones of said teeth defining a tooth gullet, the toothed belt comprising:

an end attachment part for connecting said end portion to a component including a housing part or a part to be driven by said toothed belt;

said end attachment part including a formed strip made of metal or plastic;

said formed strip being bent over 180° to define first and second legs enclosing said end portion therebetween;

said first leg being formed to have a profile corresponding to said tooth configuration so that said first leg interengages with said tooth configuration when placed thereagainst;

holding means coacting with said second leg to hold said first leg in said tooth gullets of said tooth configuration; and, said formed strip having an end section conjointly defined by said first and second legs when said formed strip is bent over and said end section defining connecting means for facilitating the connection of said end portion of said toothed belt to the component.

2. The toothed belt of claim 1, said end section being configured to be a bulge-like segment interconnecting said first and second legs; and, said bulge-like segment having an eyelet formed therein; and, said holding means including clamp hooks formed on said second leg.

3. The toothed belt of claim 2, said formed strip defining a longitudinal axis and said plurality of teeth having a predetermined tooth pitch; said second leg being a non-profiled leg having a width corresponding to the width of said end portion of said toothed belt; said second leg having respective longitudinal edges extending in the direction of said longitudinal axis; said holding means including a first and second plurality of bendable clamp hooks extending from said longitudinal edges, respectively; and, said bendable clamp hooks being spaced one from the other in correspondence to said tooth pitch and being bent over to engage in the gullets of the profile of said first leg.

4. The toothed belt of claim 1, said formed strip defining a longitudinal axis and said first and second legs having free ends; said first leg having a first pair of eyelet lugs formed on the free end thereof and said second leg having a second pair of eyelet lugs formed on the free end thereof; said first and second pairs both extending perpendicularly to said longitudinal axis; said end section being a bight segment interconnecting said first and second legs; and, said bight segment having an opening formed therein adapted to permit pushing said end portion of said toothed belt therethrough.

5. The toothed belt of claim 1, said end attachment part being configured as a single integral piece.

\* \* \* \* \*